United States Patent Office 2,952,516
Patented Sept. 13, 1960

2,952,516

PURIFICATION OF SAND

John H. Gross, Lakeland, Fla., assignor to International Minerals & Chemical Corporation, a corporation of New York No Drawing. Filed May 10, 1957, Ser. No. 658,231

12 Claims. (Cl. 23—182)

This invention relates to a process for the purification of sand. More particularly, the invention relates to a process of removing substantially all of the iron and other impurities from sand and other minerals.

Sand, which is substantially iron free, is required by the glass industry for the preparation of specialty optical products and the like. Heretofore, sand has been purified by leaching with an aqueous solution of sulfuric acid or hydrochloric acid in order to remove a major portion of the iron and other impurities from the sand. However, it has not been possible to remove sufficient iron and other impurities from the sand by these conventional procedures to produce a sand which is suitable for use in the preparation of specialty glass products.

In another process, hydrofluoric acid has been used in conjunction with these acids to purify sand. In this process, a greater portion of the iron and other impurities may be leached from the sand, but a substantial portion of the silica is also solubilized by the hydrofluoric acid.

It is a primary object of the present invention to overcome the disadvantages inherent in previously known methods of purifying sand and other minerals.

Another object of the invention is to provide an improved method of removing substantially all of the iron and other impurities from sand and other minerals.

Still another object of the invention is to provide a method of leaching iron and other impurities from sand without causing substantial solubilization of silica.

These and other objects of the invention will become apparent upon a more complete understanding of the following detailed description.

It has been discovered that iron and other impurities may be removed from sand by reacting sand containing iron compounds, in the form of an aqueous slurry, with hydrochloric acid and fluosilicic acid to dissolve iron and other impurities. The treated sand is separated from the liquid and washed with water until substantially free of acid. After separating the sand from the wash water, the sand may be heated to dryness. Sand, purified in this manner, may be suitable for use in the preparation of specialty glass products which require sand which is substantially free of iron.

More in detail, sand obtained from natural deposits, such as river sands and those located in North Carolina, Florida and other parts of the United States, may be purified by the novel process. In addition, sand concentrates produced during the beneficiation of various minerals, such as in the beneficiation of Florida phosphate rock by flotation, and of North Carolina feldspar by flotation, may also be purified by the novel process. In addition to iron impurities, sands of this type may also contain other impurities such as aluminum, calcium and phosphorus. It is preferred that the sand used in the novel process have a $SiO_2$ content of at least about 95% $SiO_2$ by weight.

Dissolution of iron and other impurities from the sand may be accomplished by reacting an impure sand in the form of an aqueous slurry with hydrochloric acid and fluosilicic acid. It is preferred to treat the sand with hydrochloric acid and fluosilicic acid simultaneously in order to reduce equipment and wash water requirements. However, similar results may be obtained by first contacting the impure sand with an aqueous solution of hydrochloric acid, separating the sand from the hydrochloric acid leaching solution, without or with water washing of the sand prior to leaching the sand with an aqueous solution of fluosilicic acid. Satisfactory results may also be obtained when the impure sand is first leached with an aqueous solution of fluosilicic acid without or with a water washing prior to leaching with an aqueous hydrochloric acid solution. The concentration of hydrochloric acid in the liquid portion of the slurry is between about 0.1 and about 38% by weight, and preferably between about 1 and about 10% by weight.

The concentration of fluosilicic acid in the liquid portion of the slurry is between about 0.1% and about 30% by weight, and preferably between about 1% and about 10% by weight.

Aqueous fluosilicic acid is preferably used, but aqueous solutions of alkali metal salts of fluosilicic acid may also be used to produce fluosilicic acid in situ, provided a source of hydrogen ions is also present sufficient to make the solution acidic. The fluosilicic acid may also be prepared by introducing silicon tetrafluoride into water or into acidic aqueous solutions, for example, into aqueous hydrochloric acid. The term "alkali metal" as used in this description and accompanying claims, is intended to include the usual alkali metals such as potassium, sodium, and lithium, and to include the ammonium radical as well.

Sand and leaching solution are introduced to a suitable container which is preferably provided with an agitating means such as a mechanical mixer. Sufficient leaching solution should be used to at least cover the sand in the container. Preferably, sufficient leaching solution is added to the sand to provide a slurry containing between about 20 and about 80% solids by weight in order that improved contact between liquid and solids may be obtained upon agitation of the slurry.

It is preferred to react the leaching solution and sand at temperatures between about 75° C. and about the boiling point in order to increase the reaction rate between the iron and leaching solution. Satisfactory removal of iron and other impurities may be obtained at temperatures between about 0° and 75° C. provided rapid reaction rates are not desired. High temperatures during the leaching step will cause volatilization of HCl and fluorine, and, therefore, the leaching apparatus should be provided with a reflux condenser when higher temperatures are used in order to minimize the loss of these reactants.

Substantially complete dissolution of iron and other impurities from the sand can be obtained under the above-mentioned conditions in about ½ to 6 hours, usually in about 2 to 3 hours. The reaction time depends upon hydrochloric acid concentration and fluosilicic acid concentration in the liquid portion of the slurry, temperature of the reaction, and the amount of iron impurities in the sand. Reaction times greater than about 6 hours may be necessary when the leaching is carried out at temperatures less than about 75° C. with leaching solutions having low concentrations of hydrochloric acid and fluosicilic acid. When the iron content of the impure sand is relatively low, a high concentration of hydrochloric acid and fluosilicic acid are present in the liquid portion of the slurry, and the tempermature of the slurry is maintained near the boiling point, substantial dissolution of iron impurities may be obtained in less than about ½ hour.

After the reaction is complete, the sand is separated from the liquid by decanting, filtration, or the like, and the purified sand is washed with water until substantially free of acid and dissolved impurities.

Wash water is removed from the sand by decanting, filtration or the like, and the sand is heated to dryness by suitable means, such as an oil fired rotating dryer. If necessary, more than one washing step may be used to remove the leaching solutions from the purified sand. The sand is preferably washed with water until the pH of the wash water is found to be substantially the same as that of fresh water as indicated by litmus paper or the like.

In another embodiment of the invention, impure sand is reacted with an aqueous solution having a concentration between about 0.1 and about 38% HCl by weight, at a temperature preferably between about 75° C. and the boiling point for a period of between about ½ and about 6 hours. The acid solution is decanted and the sand, without or with a water wash to either partially or substantially free it of acid, may then be reacted with an aqueous fluosilicic acid solution having a concentration between about 0.1 and about 29% by weight at a temperature between about 75° C. and the boiling point for a period between about ½ and about 6 hours. After the reaction is complete, the fluosilicic acid solution is separated from the sand by decanting and the sand is washed with water until substantially free of fluosilicic acid solution. Wash water is decanted from the sand and the sand is heated to dryness by a suitable means, such as an oil fired rotating dryer.

After decanting the leaching solution containing hydrochloric acid and/or fluosilicic acid from the sand, the solutions may be reconstituted with make-up hydrochloric acid and/or fluosilicic acid and reused to leach iron and other impurities from other portions of impure sand. When the $Fe_2O_3$ concentration in the leaching solutions increases to the point that the washing process becomes inefficient, the leaching solutions should be discarded.

Sand containing greater than about 99.9% $SiO_2$ by weight may be produced by the above-described novel process. Analysis of the sand produced by the novel process indicates an iron content below the lower limit of detection by the analytical method used. The procedure used to determine the iron content of the purified sand is described by Sandell in Colorimetric Determination of Metals, Second Edition, 1950, pp. 375-378, Interscience Publishers, Inc., New York, New York. It is based on the development of color when iron reacts with o-phenanthroline. The sample is dissolved by evaporating 10 grams with 75 ml. of 48% HF solution in platinum, and the residue is diluted after volatilization of $SiF_4$ to a measured volume (100 ml.) with water. An aliquot portion of the sample solution is then analyzed in accordance with the procedure described by Sandell.

The utility of the invention is illustrated by the following examples without any intention that the invention be limited thereto. All parts and percentages are by weight unless otherwise specified.

*Example I*

A sample of sand containing about 99% $SiO_2$ and about 0.0059% $Fe_2O_3$, obtained as a side product in the benefication of feldspar mined in the vicinity of Kona, North Carolina, was divided into three equal portions of about 50 parts each and designated as portion A, B and C, respectively. Portion A was mixed in a cylindrical container with about 100 parts of an aqueous solution containing about 38% HCl and saturated with potassium fluosilicate. The slurry was heated at the boiling point for about 30 minutes. Leaching solution was separated from the sand by filtration and the sand was washed with 9 portions of wash water, each portion being in an amount of about 100 parts. After separation of the sand from the wash water, the sand was dried at a temperature of about 100° C. for about 1 hour. Iron analysis of the sand, using the above-described analytical procedure, indicated a $Fe_2O_3$ content of about 0.0005%.

*Example II*

For purposes of comparison with Example I, portion B of Example I was leached with an aqueous solution containing about 38% HCl in accordance with the procedure of Example I. Analysis of the sand indicated a $Fe_2O_3$ content of about 0.0023%.

*Example III*

For further comparison with Example I, portion C of Example I was reacted with an aqueous solution containing about 38% HCl for a period of about 1 hour in accordance with the procedure of Example I. Analysis of the purified sand indicated a $Fe_2O_3$ content of about 0.0017%.

Examples II and III indicate that the use of a leaching solution containing hydrochloric acid alone is substantially less efficient than the use of a leaching solution containing both hydrochloric acid and fluosilicate ion as indicated by the result of Example I.

*Example IV*

A sample of sand obtained in the beneficiation of Florida phosphate rock by flotation means, containing about 95% $SiO_2$ and about 0.06% $Fe_2O_3$, was divided into equal parts of about 100 parts each and designated as portions D, E, F, G, H, I and J, respectively. A leaching solution containing about 5% hydrochloric acid was prepared. A separate leaching solution containing about 5% fluosilicic acid was prepared. Portion D was reacted with about 300 parts of hydrochloric acid solution for about 2 hours at a temperature of about 80° C. After separating the sand from the leaching solution, the sand was washed with about 300 parts of wash water. The sand was separated from the wash water by filtration and reacted with about 300 parts of fluosilicic acid solution for about 2 hours at a temperature of about 80° C. After separation of the sand from the leaching solution, the sand was washed with 3 portions of about 300 parts each of wash water. After separation of the sand from the wash water, it was heated to dryness at a temperature of about 100° C. for about 2 hours. No iron could be detected in the sand by the above-mentioned analytical procedure.

*Example V*

Portion E of Example IV was treated in the same manner as portion D of Example IV except that portion E was reacted with hydrochloric acid for a period of 1 hour, and then with fluosilicic acid solution for a period of about 3 hours. Analysis of the sand by the above-mentioned analytical procedure showed an iron content of about 0.0002%.

*Example VI*

Portion F of Example IV was treated in the same manner as portion D of Example IV with the exception that portion F was reacted with the hydrochloric acid solution for 1 hour and then the fluosilicic acid solution for 6 hours. Analysis of the sand by the above-mentioned analytical procedure showed that no iron was present in the sample.

*Example VII*

Portion G of Example IV was treated in the same manner as portion D of Example IV with the exception that portion G was first reacted with the fluosilicic acid solution for 1 hour and then after the usual washing, was reacted with the hydrochloric acid solution for about 1 hour. Analysis of the sand by the above-mentioned analytical procedure showed a $Fe_2O_3$ content of about 0.0003%.

*Example VIII*

Portion H of Example IV was treated in the same manner as portion D of Example IV except that portion H was reacted with hydrochloric acid solution for a period of 1 hour and with the fluosilicic acid solution for a period of 1 hour. Analysis of the purified sand by the above-mentioned procedure showed no iron to be present.

Example IX

For purposes of comparison with Examples IV to VIII, portion I of Example IV was treated in the same manner as portion D of Example IV with the exception that portion I was not reacted with the fluosilicate solution but was dried after the reaction with the hydrochloric acid solution and subsequent washing steps. Analysis of the sand by the above-mentioned procedure showed a $Fe_2O_3$ content of about 0.0018%.

Example X

Portion J of Example IV was treated in the same manner as portion D of Example IV with the exception that portion J was not reacted with the hydrochloric acid solution but was only reacted with the fluosilicic acid solution, and then washed and dried as in Example IV. Analysis of the sand by the above-mentioned analytical procedure showed a $Fe_2O_3$ content of about 0.0093%.

Examples IX and X show that the use of hydrochloric acid solution alone, or a fluosilicic acid solution alone, as a leaching medium removes substantially less iron from the sand than is removed when sand is leached with a combination of hydrochloric acid solution and a fluosilicic acid solution.

Having thus fully described and illustrated this invention, what is desired to be secured by Letters Patent is:

1. A process for removing iron from silica sand containing iron which comprises the steps of adding hydrochloric acid and fluosilicic acid as such to said sand to form an aqueous slurry, separating the sand from liquid, and subsequently washing the sand with water until substantially free of acid, whereby the sand is rendered substantially free of iron without substantial dissolution of the silica component of the sand.

2. A process for removing iron impurities from silica sand containing iron which comprises the steps of adding an aqueous leaching solution of hydrochloric acid to said sand to form an aqueous slurry, separating the sand from liquid, subsequently adding an aqueous leaching solution of fluosilicic acid to the separated sand to form an aqueous slurry, separating the sand from liquid, and washing the sand with water until substantially free of acid, whereby the sand is rendered substantially free of iron without substantial dissolution of the silica component of the sand.

3. A process for removing iron impurities from silica sand containing iron which comprises the steps of adding an aqueous leaching solution of fluosilicic acid to said sand to form an aqueous slurry, separating the sand from liquid, subsequently adding an aqueous leaching solution of hydrochloric acid to the separated sand to form an aqueous slurry, separating the sand from liquid, and washing the sand with water until substantially free of acid, whereby the sand is rendered substantially free of iron without substantial dissolution of the silica component of the sand.

4. A process for removing iron impurities from silica sand containing iron which comprises the steps of adding an aqueous leaching solution containing both hydrochloric acid and fluosilicic acid to said sand to form an aqueous slurry, separating the sand from liquid, and washing the sand with water until substantially free of acid, whereby the sand is rendered substantially free of iron without substantial dissolution of the silica component of the sand.

5. The process of claim 1 in which the hydrochloric acid has a concentration of between about 0.1 and about 38% by weight and the fluosilicic acid concentration is between about 0.1 and about 30% by weight of the liquid portion of said aqueous slurry.

6. The process of claim 1 in which the reactions between the impure sand and acids are carried out at a temperature between about 75° C. and the boiling point of the slurry.

7. The process of claim 2 in which the concentration of hydrochloric acid is between about 0.1 and about 38% by weight and the concentration of fluosilicic acid is between about 0.1 and about 30% by weight of the leaching solutions.

8. The process of claim 2 in which the reactions between the impure sand and acids are carried out at a temperature between about 75° C. and the boiling point of the slurry.

9. The process of claim 3 in which the concentration of hydrochloric acid is between about 0.1 and about 38% by weight and the concentration of fluosilicic acid is between about 0.1 and about 30% by weight of the leaching solutions.

10. The process of claim 3 in which the reaction between the impure sand and acids are carried out at a temperature between about 75° C. and the boiling point of the slurry.

11. The process of claim 4 in which the concentration of hydrochloric acid is between about 0.1 and about 38% by weight and the concentration of fluosilicic acid is between about 0.1 and about 30% by weight of the leaching solution.

12. The process of claim 4 in which the reactions between the impure sand and acids are carried out at a temperature between about 75° C. and the boiling point of the slurry.

References Cited in the file of this patent

UNITED STATES PATENTS

| | | |
|---|---|---|
| 2,031,969 | McGregor | Feb. 25, 1936 |
| 2,306,021 | Knowles et al. | Dec. 22, 1942 |
| 2,381,843 | Sherlock | Aug. 7, 1945 |

OTHER REFERENCES

Iler: "The Colloid Chemistry of Silica and Silicates," Cornell Univ. Press, 1955, p. 12.